Figure 1:
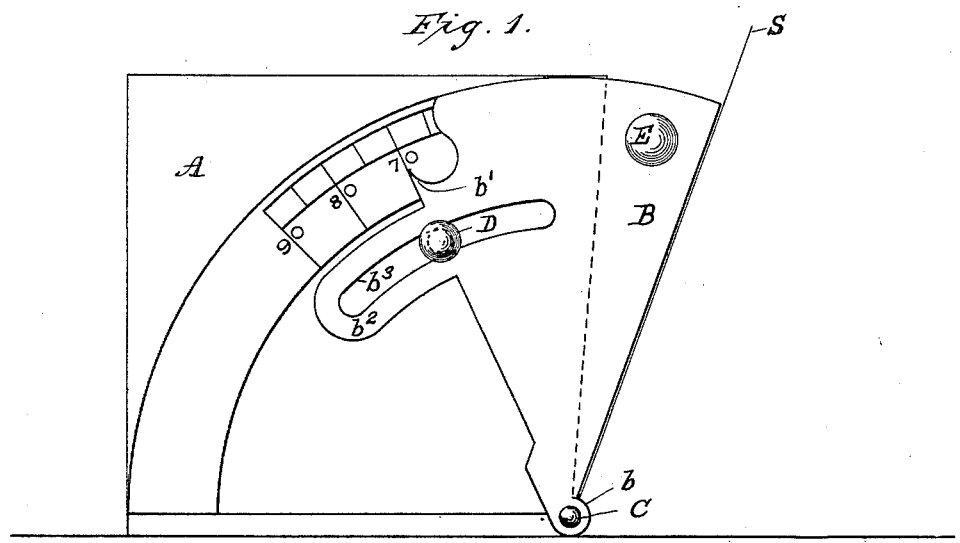

No. 659,852. Patented Oct. 16, 1900.
A. F. LIBBY.
HORSESHOE GAGE.
(Application filed Oct. 29, 1898.)

(No Model.) 2 Sheets—Sheet 1.

Witnesses Inventor
A. B. Stearns Albert F. Libby
Bayard C. Ryder By his Attorney J. B. Thurston No. 659,852. Patented Oct. 16, 1900.
A. F. LIBBY.
HORSESHOE GAGE.
(Application filed Oct. 29, 1898.)

(No Model.) 2 Sheets—Sheet 2.

Witnesses Inventor
Albert F. Libby
By his Attorney

United States Patent Office.

ALBERT F. LIBBY, OF NORTHWOOD, NEW HAMPSHIRE.

HORSESHOE-GAGE.

SPECIFICATION forming part of Letters Patent No. 659,852, dated October 16, 1900.

Application filed October 29, 1898. Serial No. 694,921. (No model.)

*To all whom it may concern:*

Be it known that I, ALBERT F. LIBBY, a citizen of the United States, residing at Northwood, in the county of Rockingham and State of New Hampshire, have invented certain new and useful Improvements in Horseshoe-Gages; and I do hereby declare the following to be a full, clear, and exact description of the invention, such as will enable others skilled in the art to which it appertains to make and use the same.

This invention relates to means for determining at what point to raise or thicken the shoe of a horse, as well as other matters pertaining to the proper shoeing of a horse, in a manner to prevent the imperfect handling of his feet, resulting in interfering, overreaching, &c. These defects in the motion of the feet of a horse are the direct result of an imperfect bearing in one or more of his feet—*i. e.*, the bearing does not come directly in the center of the frog. To correct this defect is usually a matter of guesswork with a horseshoer, and hence very apt to prove unsatisfactory.

The object of my invention is to make this class of work a matter of measurement by the use of a suitable gage graduated to degrees, as will be fully set forth in the following specification and claim, and clearly illustrated in the drawings accompanying and forming a part of the same, of which—

Figure 2:
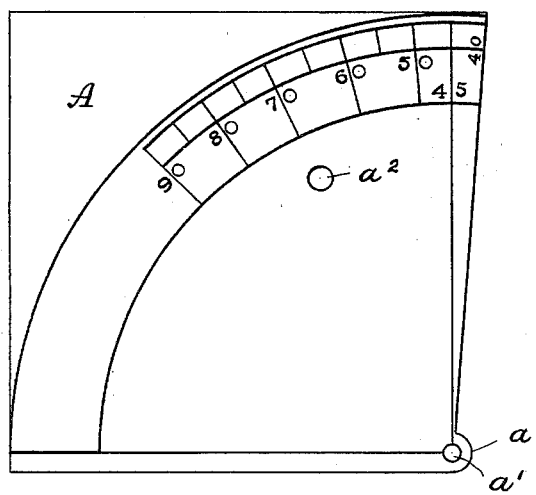
Figure 3:
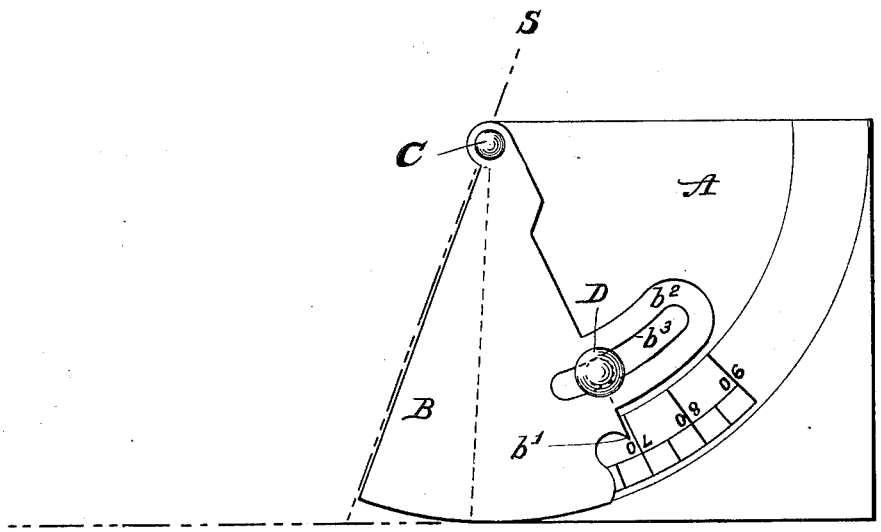

Figure 1 is an elevation showing my improved gage as when in position to measure the angle of one side of the hoof of a horse, the hoof being represented by a single line and the floor or ground by another line. Fig. 2 is a detailed elevation of that portion of my gage which is graduated to degrees. Fig. 3 shows my improved gage as inverted, when it is especially adapted for use in determining the necessary amount to raise a hoof on either quarter.

Similar reference-letters denote corresponding parts in the views.

There is no exact rule governing the degree of inclination of the hoof of a horse, which varies in different animals; but in the healthy hoof of a sound horse the angle of one side will be that of the other, and any variation one from the other means trouble ahead, as this indicates that the bearing is thrown to one side of the frog from the improper growth of the hoof.

My improved gage comprises two parts, one movable upon the other by pivot connection. The plate A is substantially rectangular in form, one of its corners being rounded, as at $a$, and provided with a concentric perforation $a'$, and one of the edges of said plate A, adjacent to said round corner, is formed on an angle of five degrees, and commencing at this edge, running from right to left, the plate is graduated on an arc of a circle in degrees, each five degrees being indicated by a mark and every ten degrees being indicated by a longer mark and numbered from "40" to "90," the graduation or mark indicating forty-five degrees being at a right angle with the bottom edge of the plate and cutting the center of the perforation $a'$, which latter is also the center of the arc in which the graduations are made. The plate B measures forty-five degrees from side to side and is connected at $b$ by a pivot C to the plate A at $a'$ and is provided with a pointer $b'$, as shown. A tongue $b^2$ projects on a curve corresponding with that of the graduations from that edge of the plate B at which the pointer $b'$ is formed and has a curvilinear perforation $b^3$, through which a thumb-screw D is passed and threaded at $a^2$ to the plate A, said screw D serving to secure the plate B, for a purpose to be hereinafter explained. A knob E may be attached to the plate B at any convenient point, by which said plate may be adjusted.

The amount necessary to raise either side of a shoe in order to correct any defect in the bearing of a horse's foot is found by computing the variation in the angle of opposite sides of his hoof, and by placing my improved gage first at one side of the hoof, as seen in Fig. 1, loosening the thumb-screw D, and moving the plate B outward, so that it rests against the hoof, (represented by the line S,) the screw D may be again tightened and a record made, the pointer $b'$ in the present instance in Fig. 1 showing the angle of the hoof on the side measured to be seventy degrees. The same operation is then repeated at the opposite side of the hoof, when the difference is readily discovered; but when a horse "paddles," as it is called, his hoof curves first outward and then inward, striking the ground on a twist, thus throwing his weight upon either the inside or outside "quarter," and by thickening the shoe, so as to raise the hoof at that particular point, the above defect in his step is thereby remedied, and the horse will then step correctly, planting his foot straight upon the ground. To determine the necessary amount to raise the hoof on either quarter, my improved gage is especially adapted by reversing the same—i. e., turning it upside down or opposite to position shown in Figs. 1 and 2—the extreme end of the curved plate B then reaching under the quarter, and the distance from the point of the gage to the ground will indicate the amount necessary to increase the thickness of the shoe on the low side.

I have described only one use to which my improved gage may be put, as that is sufficient to illustrate its utility, but there are of course other uses for it not necessary here to enumerate.

Having described my improvement, what I claim is—

As a means of determining the proper amount to thicken the shoe of a horse so as to raise his hoof to throw the bearing directly in center of the frog, a gage composed of a movable and stationary member pivotally connected, the stationary member being substantially rectangular and provided with graduations as shown, said gage being adapted to be inverted for use on either quarter, when the distance to the ground from the outer corner of the movable member will determine the amount said quarter should be raised.

In testimony whereof I affix my signature in presence of two witnesses.

ALBERT F. LIBBY.

Witnesses:
J. B. THURSTON,
EMILE H. TARDIVEL.